United States Patent [19]

Fogg et al.

[11] 4,292,762
[45] Oct. 6, 1981

[54] MODULAR TRANSPORTABLE CONTROLLED ENVIRONMENT AGRICULTURE FACILITY

[75] Inventors: Lewis W. Fogg, Cazenovia; Robert W. Metzler, Baldwinsville; H. Eugene Satterfield, North Syracuse; Eion G. Scott, Fayetteville, all of N.Y.

[73] Assignee: Control Data Corporation, Minneapolis, Minn.

[21] Appl. No.: 61,670

[22] Filed: Jul. 30, 1979

[51] Int. Cl.³ .......................... A01G 9/24; A01G 9/14
[52] U.S. Cl. ........................................ 47/17; 47/18; 47/19; 98/32
[58] Field of Search .................... 47/17, 18, 19, 65; 98/32

[56] References Cited

U.S. PATENT DOCUMENTS

| 4,028,847 | 6/1977 | Davis et al. | 47/65 |
| 4,091,566 | 5/1978 | Horvath et al. | 47/17 |
| 4,163,342 | 8/1979 | Fogg et al. | 47/17 X |
| 4,196,544 | 4/1980 | Davis et al. | 47/17 |

FOREIGN PATENT DOCUMENTS

| 8589 | 8/1933 | Australia | 47/17 |
| 2225603 | 1/1973 | Fed. Rep. of Germany | 98/32 |

Primary Examiner—Steven A. Bratlie
Attorney, Agent, or Firm—Frederick W. Niebuhr; Joseph A. Genovese; Carl W. Baker

[57] ABSTRACT

This disclosure is of a controlled environment agriculture facility in which a plurality of plant grow support racks are structured and arranged within a plant grow enclosure to define an air return passage from the enclosure with air ingress to such passage being distributed over surfaces of the racks. This provides good uniformity of air distribution within the enclosure and affords improved transportability and installation of the facility.

3 Claims, 4 Drawing Figures

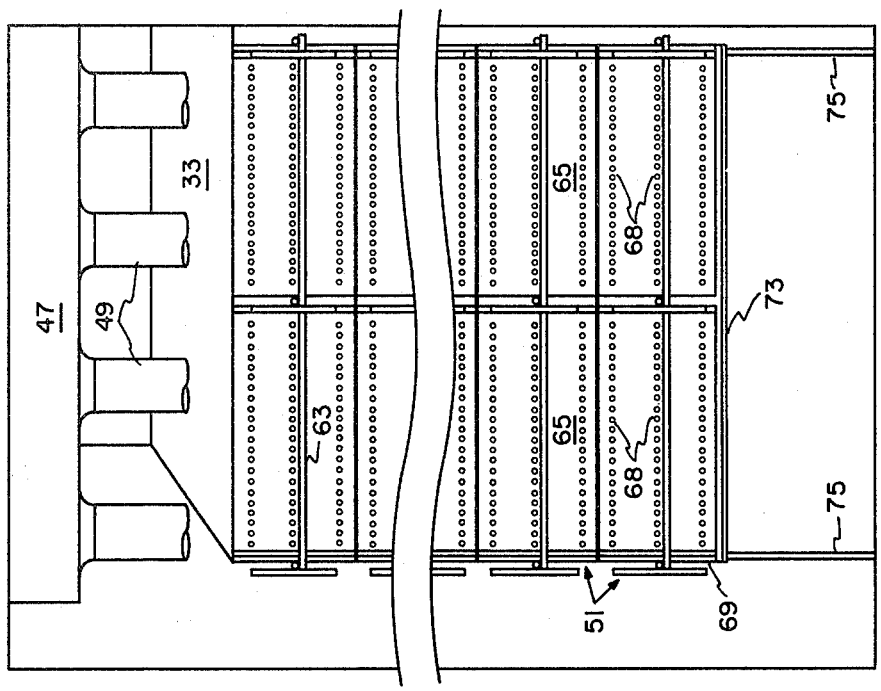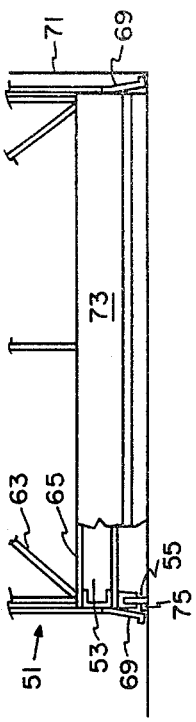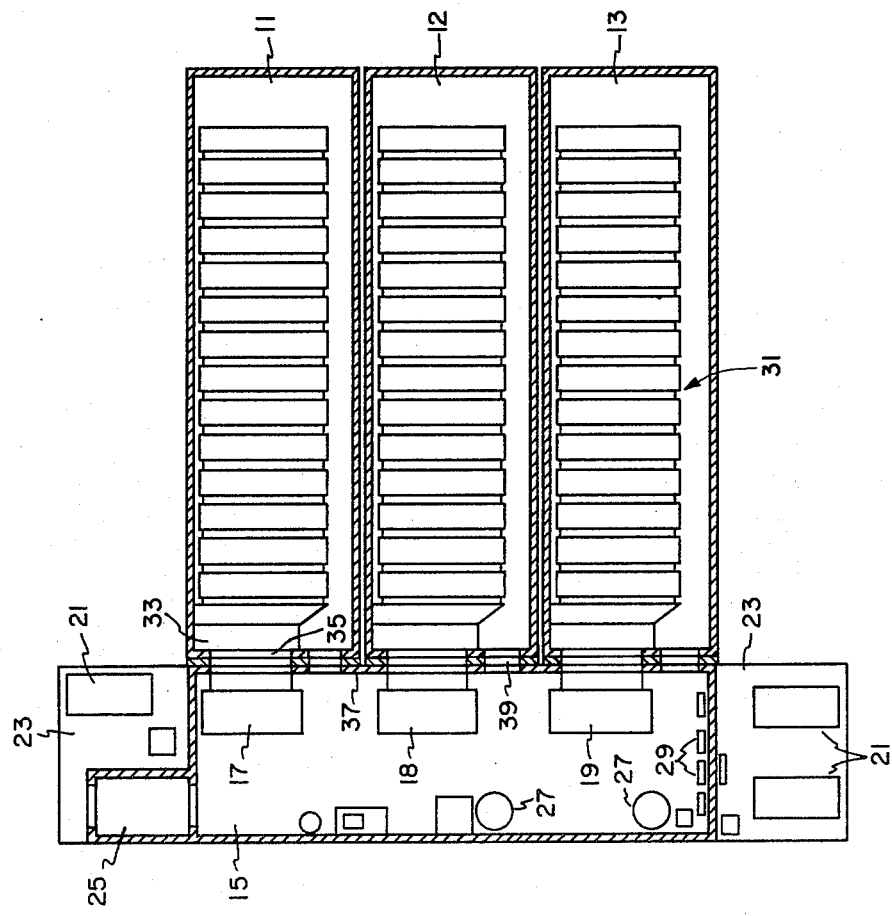

MODULAR TRANSPORTABLE CONTROLLED ENVIRONMENT AGRICULTURE FACILITY

The Government has rights in this invention pursuant to Contract DAAK60-77-C-0065 awarded by the Department of the Army.

BACKGROUND OF THE INVENTION

This invention relates generally to controlled environment agriculture apparatus and facilities more specifically to such apparatus and facilities modularized to facilitate transportability to or between installation and use sites.

As described in greater detail in copending application Ser. No. 889,965 filed Mar. 24, 1978 now U.S. Pat. No. 4,163,342 by Fogg et al, controlled environment agriculture is the cultivation of vegetable, ornamental and other plants in an enclosure within which all those environmental factors which are generally recognized as influencing plant growth, maturation and productivity, are systematically time programmed and carefully controlled. As also explained in that application, such environmental control technology may most effectively be implemented using a nutrient film technique in which the plant roots are contained in sloped troughs or gullies through which a low-volume nutrient solution flow is effected.

One of the controlled environment agriculture (CEA) problem areas to which the invention of the aforementioned Fogg et al application was directed is that of maintaining good uniformity of distribution of the supply of air to and about the plants being cultivated, throughout the CEA enclosure. With conventional air supply and distribution arrangements there normally will exist substantial inequalities of temperature and areas of stagnation of air, neither of which is conducive to optimized plant growth. These problems are compounded by the relatively close concentration of plants required for efficient utilization of the CEA enclosure space, and by the substantial infrared energy output of the high intensity lamps which are the preferred source of illumination.

To minimize these problems and to assure equalized distribution of air supply to all plants within the CEA enclosure volume, the aforesaid Fogg et al application discloses a number of alternative embodiments of air distribution control means. The present invention is directed to another such means, similar in basic purpose and operation to the air distribution control of the Fogg et al application but affording significantly better adaptability to use in transportable facilities, i.e., CEA facilities which can readily be shipped to and installed in remote locations or removed between such locations.

To facilitate such transportability, the CEA facilities of the invention are modularized by division into one or more plant growth modules and a service module which contains or carries such accessory and support equipment as the air conditioning units and the nutrient storage and supply system. The plant growth module or modules and the service module may conveniently be interconnected during installation using quick-disconnect devices in the various supply and return lines of the nutrient system, and with similarly disconnectable couplings between the air conditioning units in the service module and the air distribution and return systems in the plant growth modules. In accordance with the invention these air return systems are incorporated into plant support rack assemblies which are movably housed within the plant growth modules, and the module structures themselves require only the simplest of air fittings thus greatly facilitating module transportability and installation.

The modularized facility of the present invention is not limited in applicability to use in installations requiring transportability, but may also be advantageous for fixed installations as well. In such installations the modularized design enhances the adaptability of the facility to specific local needs, as by enabling its sizing to achieve desired output objectives and configuration of its plant support systems for optimized growth of the specific vegetables or other crops necessary to satisfy nutritional requirements or dietary preferences of the particular locality in which the facility is sited. Reconfiguration of the facility to adapt it to crop changes from season to season or locality to locality is similarly easily accomplished without modification of the basic module structure.

BRIEF SUMMARY OF THE INVENTION

The present invention provides controlled environment agriculture apparatus characterized by good transportability and ease of installation on site, while enabling the maintenance of optimized plant growth conditions readily adjustable to meet the needs of the particular cultivars being grown and of the particular environment in which the apparatus is to operate. These advantages derive in substantial part from modularity of design of the apparatus, and from an air supply and distribution system which is structurally compatible with such modularity and provides effective control of air distribution within the modules so as to assure good uniformity of air distribution to the plants growing within them.

Briefly, the air supply and distribution system of the invention in its preferred embodiment comprises a plurality of air supply outlets located near the ceiling of the module and preferably spaced fairly uniformly within it. The air system also comprises air distribution and return duct means which are formed in substantial part by the plant grow rack assemblies themselves, rather than by fixed module structures. To this end, each of the grow rack assemblies comprises one or more perforated horizontal panel members which are located just below the troughs or gullies in which the plants are grown and which are disposed in vertically spaced relationship with the module floor, so as to define horizontally extending spaces between the panel members and floor. At both sides of the rack assemblies this space is closed, being closed on at least one side by a skirt or wall member. The other side may be similarly closed or it may instead be closed by butting the rack against the adjacent wall of the module.

The rack assembly elements thus constituted define three sides of a horizontal duct which extends the full width and length of each rack: the fourth side is defined either by additional imperforate horizontal panels mounted below and parallel to the perforated upper panels, or, preferably, by the floor itself. Then, when the several racks of the array are snugged up against each other without spacing between them, their top and side panels define, together with the floor or with the bottom panels if such are provided, a continuous duct which extends the full length of the rack array. Air ingress to this duct from the interior of the module is through the perforated surfaces of the rack panel members. The perforations in these panels serve as air flow control devices which, due to the substantially uniform pressure differential across all of them, tend to maintain equalized flow through each. They serve thus as air flow control means, and since the perforations of each rack assembly are individual to it they provide equalization of air flow and more uniform velocity of air movement over the entire surface of the rack array.

Associated with the grow modules is a service module containing the air handlers and other auxiliary equipment such as nutrient storage and supply systems as well as the electrical power and control systems for the facility. The air handlers located in this service module are coupled through quick-disconnect devices to an air supply plenum and through it to the air supply distribution means, and to a return plenum having an opening against which the proximate one of the plant grow racks is butted to provide free communication between the return plenum and the return duct formed by and beneath the plant grow rack array as previously described. The remote end of the return duct is closed as by a panel or skirt affixed to the outside face of the end rack assembly.

The racks conveniently may be wheeled or otherwise mounted for movement within the module. During such movement the air return duct and the control of distribution of return air as just described is necessarily disturbed, but normally such disturbances need be permitted to continue only for short times and hence they do not significantly interfere with plant growth or productivity. At least one of the modules may be provided also with a nursery facility which may conveniently be located above the return air plenum just described.

BRIEF DESCRIPTION OF THE DRAWINGS

The novel and distinctive features of the invention are set forth in the claims appended hereto. The invention itself, however, together with various of its further objects, features and advantages, may best be understood by reference to the following detailed description when read in conjunction with the accompanying drawings, in which:

FIG. 1 is a part-sectional plan view of a controlled environment agriculture facility in accordance with the invention;

FIG. 3 is a plan view of the module of FIG. 2 illustrating the arrangement of flow control apertures in the grow rack assemblies within the module; and FIG. 4 illustrates a detail of the rack structure in the module of FIG. 3.

DESCRIPTION OF THE PREFERRED EMBODIMENT

Figure 2:
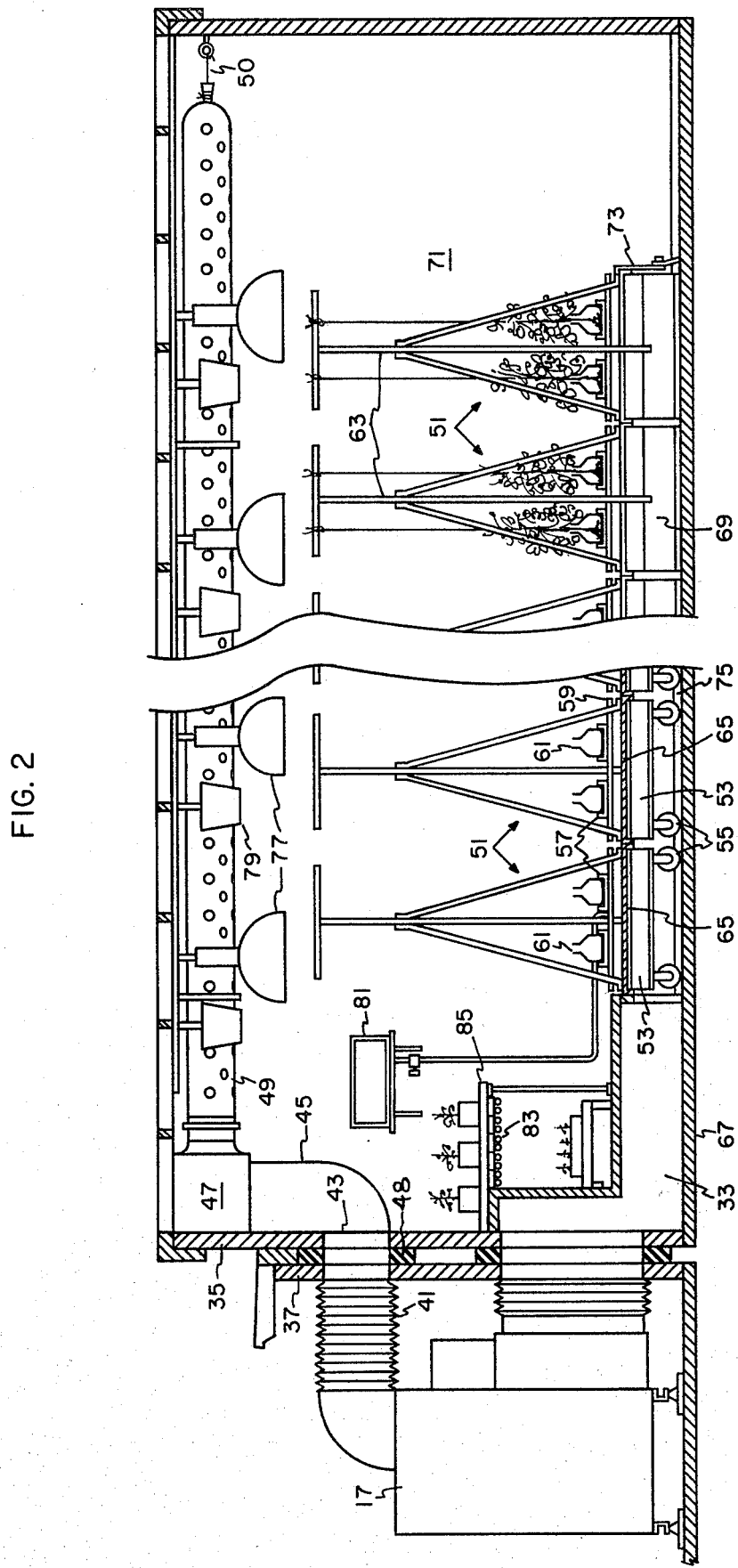
FIG. 2 is a part-sectional view through one of the plant growth modules and a part of the service module comprising the facility of FIG. 1.

With continued reference to the drawings, wherein like reference numerals have been used throughout to designate like elements, FIG. 1 illustrates a transportable controlled environment agriculture facility incorporating three plant grow modules 11, 12 and 13 together with one service module 15 which provides all the required support functions for the plant grow modules. The grow modules and the service module all may conveniently and economically be adapted from conventional trailer or field shelter type structures, assembled onsite to the configuration shown with the grow modules butted up against one or both sides of the service module for receiving support services therefrom. Depending upon transport and site requirements, the units may be provided with wheeled undercarriages, and if desired the grow modules may be provided with collapsible wall structures to facilitate transport and reduce shipping costs.

The service module contains among other support equipment items a number of air-handling units 17, 18 and 19, normally one for each of the grow modules 11–13. The compressor or heat pump units 21 associated with these air-handlers preferably are located just outside the service module, and as illustrated these units may conveniently be mounted on decks 23 located at either or both ends of the service module. At one end, an air lock 25 provides access to the service module and, through it, to the grow modules. Various items of support apparatus, such as nutrient tanks 27, associated pump and control equipment also forming part of the nutrient supply system, electrical equipment as at 29, and similar auxiliary equipments may be housed within the service module as convenient.

Within each of the plant grow modules 11–13, there is located a plurality of plant grow rack assemblies disposed in juxtaposed relation with each other such that the assemblies together form a rack array 31 extending substantially the full length of the module. Sufficient space is required at one end of the module for the return plenum 33 forming part of the air system to be described, and at the other end some space is left open so as to enable movement of the racks as necessary to provide access to the individual racks and to the plants carried on them, when access is needed for purposes of planting, pruning and other plant husbandry tasks.

As shown in FIGS. 1 and 2, the grow module 11 is positioned against the service module 15 with the end wall 35 of the former abutting or closely adjacent to the side walls 37 of the latter. Aligned openings 39 cut in the opposed walls of the modules provide doors for personnel access to the grow modules, and if desired those modules may also include exit doors (not shown) at their opposite ends for emergency use.

As best seen in FIG. 2, the air handler 17 includes a supply duct 41 which opens through a quick-disconnect coupling 43 and ducting 45 into a supply plenum 47. The coupling 43 may as illustrated comprise simply a pair of aligned openings in the juxtaposed wall members of the plant grow and service modules, with a surrounding annular seal member 48 of resilient material compressed between the wall members. Plenum 47 supplies air to a plurality of apertured tubes 49 which are disposed parallel to each other adjacent to the ceiling of the module and serve as distribution headers. These headers conveniently may be formed of film plastic which collapses when the pressurized air supply to them is cut off; to hold them in position under such conditions the cords 50 by which the free ends of the tubes are tied closed may be affixed to any convenient support, as for example to an adjacent end wall of the module, to thus maintain the tubing in stretched condition ready for inflation upon supply of air pressure to its interior.

The air supply preferably is at a pressure substantially greater than atmospheric, so as to enhance the equalization of air distribution through the header apertures and throughout the enclosed space within the module, and to maintain the module air pressure level at a substantial differential over atmospheric. This minimizes the possibility of entrance of external air into the module except through the air conditioning system. The air lock 25 previously mentioned serves the same purpose and conserves against air loss when the module doors must be opened for personnel ingress and egress.

The air system is of closed loop or recirculating type with return air from the module being coupled to the return air plenum 33 through a return duct which, in accordance with the invention, is formed by the plant grow rack array itself. As shown, each of the rack assemblies 51 comprises frame members 53 defining a rectangular base structure which conveniently may be provided with casters or wheels 55 as shown to provide mobility of the rack assemblies. Each rack frame or base structure provides support for a pair of elongated trough members 57 which span the width of the rack and which are supported on rods 59 mounted at different heights at its opposite ends. This mounting imparts sufficient slope to the trough members for gravity-induced flow of nutrient solutions through the plant grow gullies 61 one of which is supported on each of the trough members.

These gullies 61, which preferably are formed of a plastic material bent or folded to the configuration shown, are of length substantially equal to the widths of the racks and are spaced from each other to provide room for plant growth and for free flow of air between adjacent gullies and between the trough members which support them. The racks 51 may also include plant support members 63 for training and supporting the upper growth of the plants as illustrated at the right in FIG. 2. The several rack assembly elements thus far described may be of the form shown and described in greater detail in the aforementioned copending application of Fogg et al.

Each of the plant grow rack assemblies further comprises a horizontal plate of panel member 65 which spans the length and width dimensions of the rack and is disposed beneath the trough members 57 in parallel and spaced relationship with the module floor 67 so as to define therewith a space extending longitudinally of the rack array and transversely for the full width of the racks of the array. As best shown in FIG. 3, each of these rack panel members 65 is provided with a plurality of spaced apertures 68 of relatively small diameter, preferably approximately one to two inches in diameter depending on the total number of apertures, with the apertures being distributed substantially uniformly along the length of the panel member.

As seen in FIGS. 3 and 4, in which the plant grow gullies 61 and troughs 57 have been omitted, the sides of the rack base structures are provided with depending skirts 69. Such skirts may be provided on both sides of the racks as shown in FIG. 4 or, if preferred, only on the side removed from the module wall 71 with the wall itself being employed to close off the space beneath the rack panel members on the other side by positioning the rack against it. The one rack assembly most remote from the supply end of the module includes a transversely extending skirt element 73 to close off access to the space beneath the rack assemblies on this end.

As will be obvious from what has already been said, the space thus formed between the rack panel members 65 and the floor 67 (or, if preferred, a second horizontal panel member of imperforate material carried by each rack assembly just above the floor) defines a substantially enclosed air space to which the entrance of air is controlled by the apertures 68 and from which the only exit opening is that at the end of the rack assembly array adjacent to the air return plenum 33. Here, this plenum is formed with an opening which is complementary in dimensions and shape to the rack assemblies so that when the adjacent assembly is butted up against the plenum the air return duct formed between the rack array structure and the opposing floor surface opens directly into the plenum, thus completing a path for the flow of return air back to the air handler 17. In this way air circulation is continuous with temperature and humidity control for the circulating are preferably being provided as more fully explained in the aforementioned Fogg et al application.

Since with this arrangement each of the rack assemblies has associated directly with it its own group of air flow control apertures 68, and since each of those apertures tends to maintain equalized flow of air due to the substantial equality of pressure differential across all the apertures throughout the module, good uniformity of distribution of air flow over each of the rack assemblies within the module is thus assured, and inequalities of temperature and areas of stagnation of air are avoided.

To enable access to the individual racks of the array, and access to the plants carried by them for purposes of plant care activities such as pollenization, pruning and harvesting, guide rails 75 may be provided as shown affixed to the module floor, to constrain motion of the rack assemblies to movements parallel with their width dimensions. Of course, when the rack assemblies are thus moved, the integrity of the return air duct formed by them no longer exists, and the return air may then flow directly into the open end of whatever portion of the array remains still connected to the plenum 33. Such condition continues only temporarily, however, so it does not significantly affect plant growth or productivity.

Referring again to FIG. 2, illumination of intensity and spectral characteristics optimized for plant growth is provided by a bank of overhead high intensity discharge lamps 77, the ballasts associated with which are indicated at 79. Nutrient may be supplied to the plant grow gullies 61 from a tank 81 through supply fittings enabling movement of the plant grow rack assemblies 51 either by coupling through flexible hoses or using supply and return plumbing as shown and described in detail in the aforementioned Fogg et al application.

Conveniently, the upper surface of the air return plenum housing 33 may be used as a nursery area for starting seeds, with a bank of fluorescent lights 83 being provided for illumination of the seedlings. As the seedlings grow, they may be transferred initially to the bench area 85 just above, for acclimation to the lighting and other environmental conditions of the module itself, before final transplantation into the plant grow gullies 61.

As will be apparent to those skilled in the art, the modularized controlled environment agriculture facility of the present invention enables very quick assembly with greatly facilitated module transportability and installation. The modularized design is also of advantage in fixed installations in that it facilitates sizing to achieve desired output objectives and reconfiguration for adaptation to crop changes and local conditions, permitting individual control of the separate modules as necessary to the requirements of the particular crop to be grown in that module. The air distribution system affords good control of air distribution within the modules, without need for complex distribution structure built into the module itself, and with the air return flow control and ducting instead provided as integral parts of the grow rack assemblies.

In addition to the several possible modifications in and alternatives to the specific embodiment of this invention described in the foregoing, various others will be obvious to those skilled in the art. It accordingly should be understood that the appended claims are intended to cover all such modifications as fall within the true spirit and scope of the invention.

What is claimed as new and desired to be secured by Letters Patent of the United States is:

1. A controlled environment agriculture facility comprising:
   (a) wall and floor means defining a plant growth module within which a controlled atmosphere may be maintained;
   (b) air handling means including means for supplying air into said module and means for receiving return are therefrom;
   (c) a plurality of plant grow rack assemblies disposed within said module, each assembly including a panel member spaced apart from said floor means, each panel member having means defining a plurality of apertures therein; and
   (d) means mounting each of said rack assemblies for movement relative to said floor means thereby to enable access to each rack assembly, and further to enable movement of said rack assemblies to and from an arrayed position in which said panels cooperate to form a continuous rack array surface in spaced relation to said floor means and defining therewith a continuous air return duct extending substantially the length of said module and connecting at one end with said return air receiving means whereby return air flow from the module is constrained to flow through said apertures, said apertures controlling said return air flow and tending to equalize said flow over said rack array surface.

2. A controlled environment agriculture facility as defined in claim 1 wherein said air return duct is further defined by depending skirt means carried by said rack assemblies along at least one side of each thereof and along the outwardly facing end of the rack assembly most remote from said return air receiving means.

3. A controlled environment agriculture facility comprising:
   (a) wall and floor means defining a plant growth module within which a controlled atmosphere may be maintained;
   (b) air handling means including a supply air plenum and a return air plenum, and means for moving air from the return air plenum through conditioning means to the supply air plenum;
   (c) distribution header means disposed within said plant growth module and connected to said supply air plenum for distribution of air therefrom within said module;
   (d) an array of plant grow rack assemblies disposed within said module, each of said rack assemblies including a plant support means and further including a panel member coextensive with its associated rack assembly in its width and length dimensions and carried by the associated rack assembly below said plant support means in vertically spaced relation above said floor means each panel member having means defining a plurality of apertures therein; and
   (e) means mounting each of said rack assemblies for movement relative to said floor means thereby to enable access to each rack assembly, and futher to enable movement of the rack assemblies to and from an arrayed position in which the panels cooperate to form a continuous rack array surface above said floor and define therewith an enclosed air passage beneath the rack array surface, extending substantially the length of the module and open at one end directly into said return air plenum whereby return air flow from the module is constrained to flow through said apertures, said apertures controlling said return air flow for improved uniformity of air flow rate over said rack array surface.

* * * * *